United States Patent [19]

Toyama

[11] Patent Number: 4,931,635
[45] Date of Patent: Jun. 5, 1990

[54] OPTICAL POSITION SENSOR USING FARADAY EFFECT ELEMENT AND MAGNETIC SCALE

[75] Inventor: Kiyoshi Toyama, Gifu, Japan

[73] Assignee: Teijin Seiki Company Limited, Osaka, Japan

[21] Appl. No.: 271,431

[22] Filed: Nov. 15, 1988

[30] Foreign Application Priority Data

Dec. 1, 1987 [JP] Japan .................. 62-303813
Mar. 4, 1988 [JP] Japan .................. 63-51824

[51] Int. Cl.$^5$ .......... G02F 1/01; G01D 5/34; G01B 7/14
[52] U.S. Cl. .............. 250/225; 250/227.17; 250/231.13; 324/260; 324/207.13; 360/114
[58] Field of Search .......... 350/375, 376, 378, 377; 360/114; 365/122; 341/13-15; 324/96, 207, 208, 244, 260; 250/231 SE, 237 G, 225, 227; 356/373

[56] References Cited

U.S. PATENT DOCUMENTS

| | | | |
|---|---|---|---|
| 3,453,614 | 7/1969 | Bose | 341/15 |
| 3,465,322 | 9/1969 | Stapper, Jr. | 360/114 |
| 3,870,397 | 3/1975 | Dillon, Jr. et al. | 350/375 |
| 4,153,329 | 5/1979 | Gillette | 350/375 |
| 4,228,473 | 10/1980 | Himuro et al. | 350/375 |
| 4,356,395 | 10/1982 | Miller | 341/14 |
| 4,609,961 | 9/1986 | Jacobs | 360/114 |
| 4,618,901 | 10/1986 | Hatakeyama et al. | 360/114 |
| 4,654,837 | 3/1987 | Browder | 369/13 |
| 4,695,796 | 9/1987 | Omet et al. | 250/577 |
| 4,730,289 | 3/1988 | Saitoh et al. | 360/114 |
| 4,745,357 | 5/1988 | Miller | 350/375 |
| 4,746,791 | 5/1988 | Forkel et al. | 250/231 SE |
| 4,777,553 | 10/1988 | Aoi et al. | 360/114 |
| 4,823,083 | 4/1989 | Meunier et al. | 324/244 |

Primary Examiner—David C. Nelms
Assistant Examiner—Michael Messinger
Attorney, Agent, or Firm—Lane & Aitken

[57] ABSTRACT

An optical position sensor of aircraft comprises light emitting means, first optical wave guiding means connected at its one end to the light emitting means, and polarizing means connected at its one end directly to the other end of the first optical wave guiding means. A Faraday effect element is connected at its one end directly to the other end of the polarizing means and has reflecting means at its other end. A movable magnetic scale is disposed in opposed relationship to the reflecting means and having a plurality of magnetized segments mounted thereon. The sensor further comprises polarization detecting means connected at its one end directly to the other end of the Faraday effect element, second optical wave guiding means connected at its one end directly to the other end of the polarization detecting means and adapted for guiding the light from the polarization detecting means, and optoelectric converting means connected to the other end of the second optical wave guiding means.

3 Claims, 18 Drawing Sheets

SCHMITT TRIGGER CIRCUIT

DIRECTION OF MAGNETIC FIELD

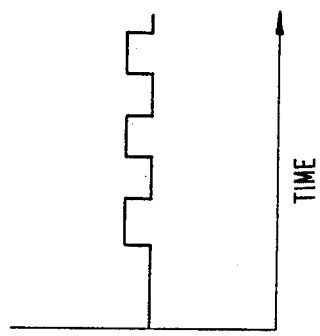
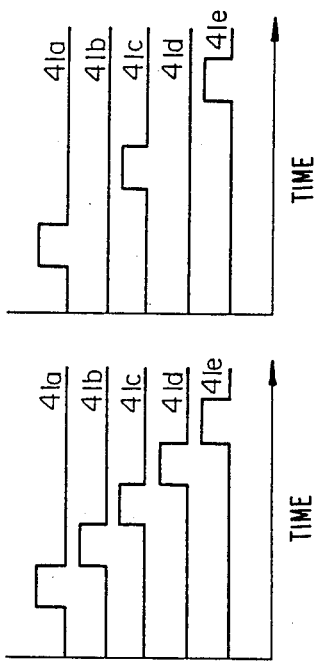

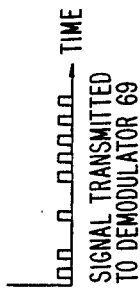
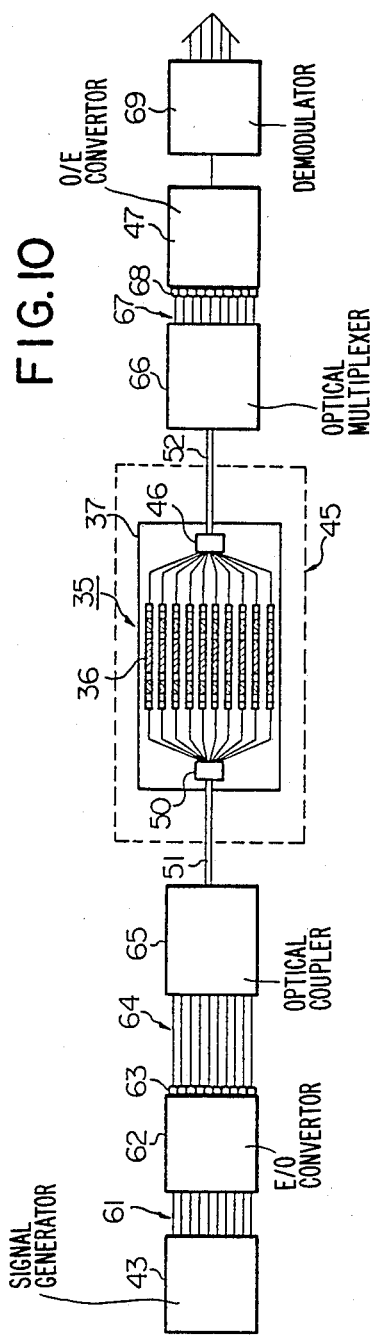
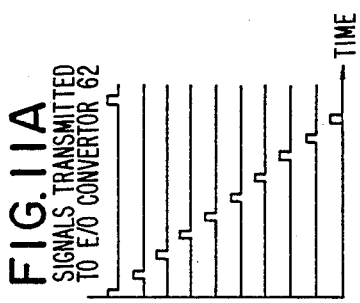

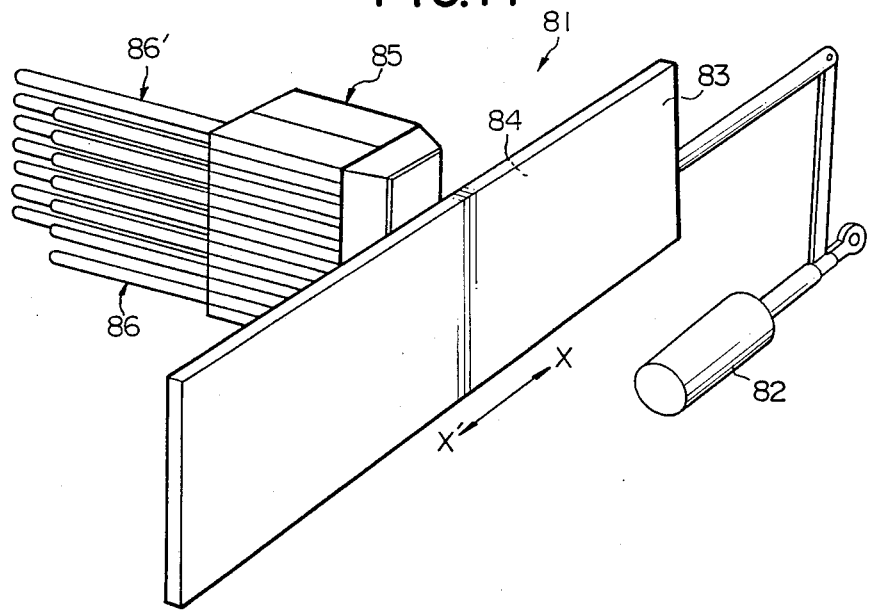
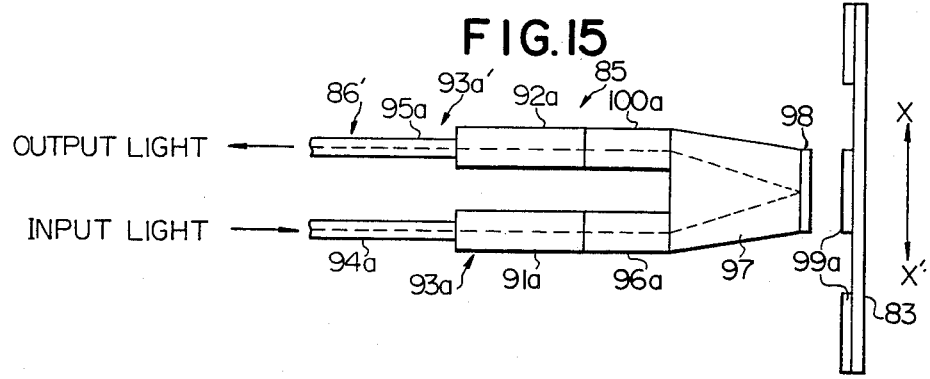

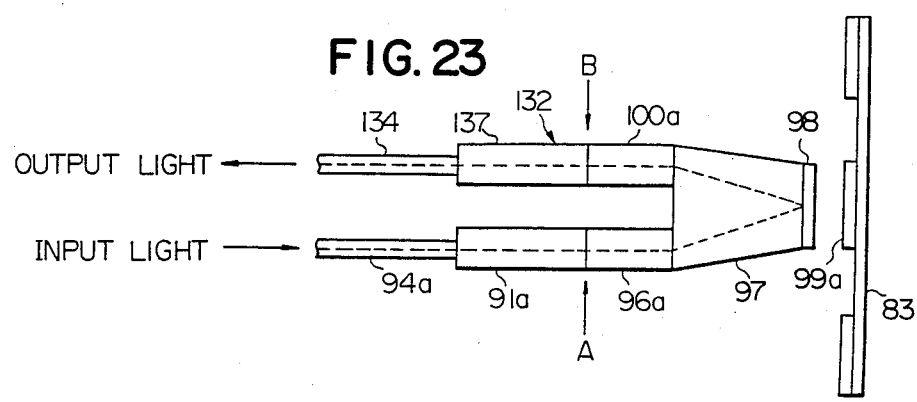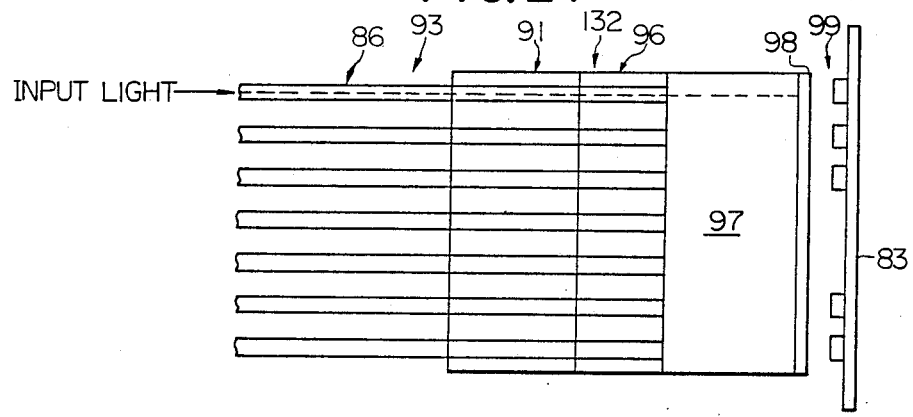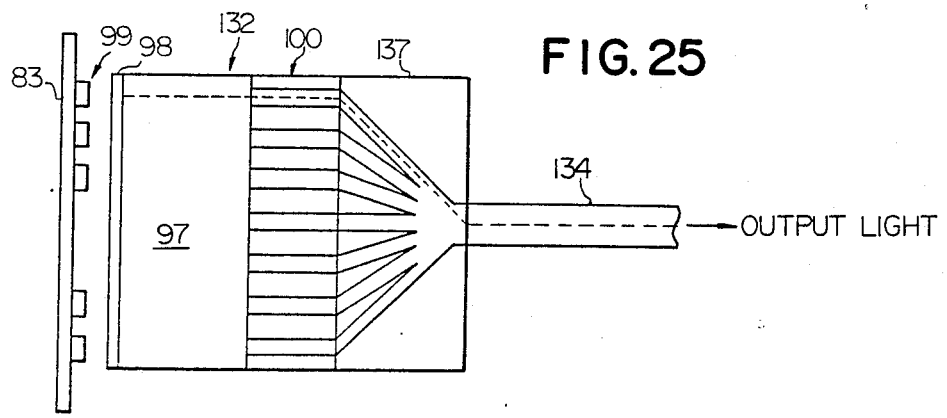

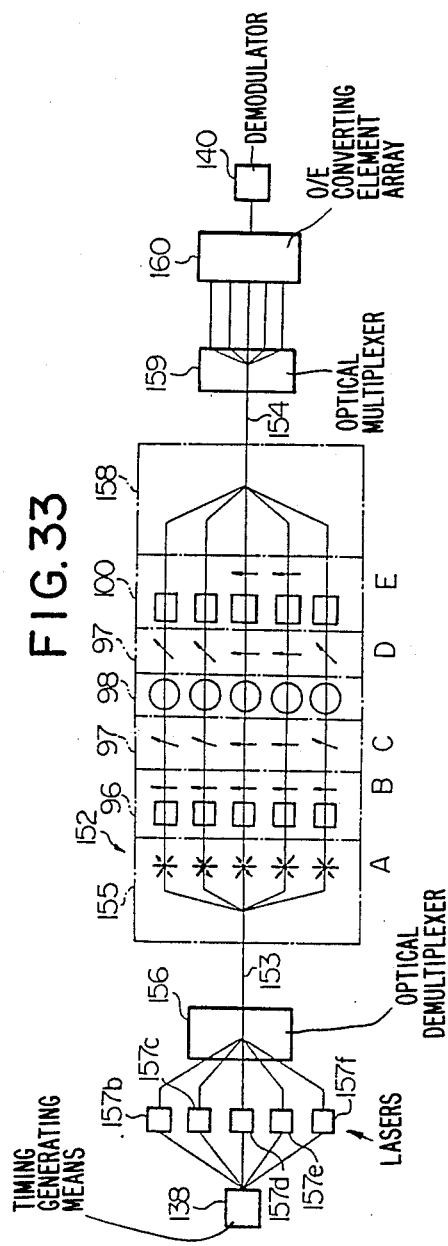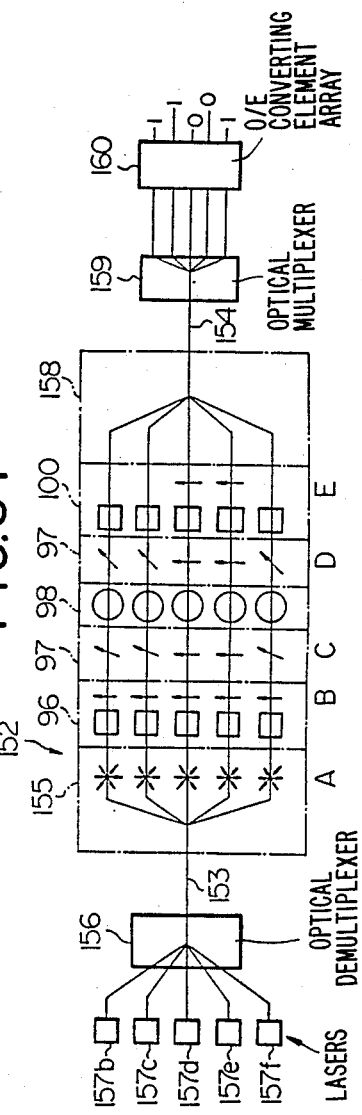

OPTICAL POSITION SENSOR USING FARADAY EFFECT ELEMENT AND MAGNETIC SCALE

FIELD OF THE INVENTION

The present invention relates in general to an optical position sensor, and in particular to an optical position sensor wherein a Faraday effect element is utilized.

DESCRIPTION OF THE PRIOR ART

In aircraft and the like, the control surface of rudders, elevators and the like is controlled by control signals steered by a pilot.

Such control signals were conventionally transmitted through a mechanical link mechanism to the control surface of aircraft and the like, but a fly-by-wire method has been recently used wherein control signals are replaced with electrical signals.

FIG. 1 schematically illustrates the operational principle of an actuator for controlling control surfaces of aircraft and the like wherein a fly-by-wire method is employed. A control signal from a pilot A moves an electrical hydraulic servo control valve 3 through a FCC (Flight Control Computer) by a connector 2, and controls the control surfaces of aircraft and the like by an actuator 4. The movement of the control surfaces is detected by the piston of a position detecting mechanism 5, and the amount of the movement is converted into an electrical signal by a differential transformer 6 and fed back to the FCC through the connector 2.

However, a control system utilizing electrical signals as described above tends to damage the stability of operation due to electrical noises. Such a control system therefore has been replaced with a control system utilizing optical signals which is not subjected to the influence of electrical noises. In this case, an optical sensor is needed in the position detection of an actuator for controlling control surfaces of aircraft and the like.

Optical rotary encoder, optical linear encoder and the like which have an encoder plate and light emitting and receiving portions may be used as the aforesaid optical sensor. FIG. 2 schematically illustrates the principle of an actuator for controlling control surfaces of aircraft and the like wherein an optical linear encoder is employed. A signal generator generating reference pulse signals is designated by reference numeral 7, and successively transmits time-delay pulse signals to each of transmission lines generally designated by reference numeral 8. These pulse signals are supplied by an E/O (electro-optical) converter 9 to a light emitting element array 10 comprising light emitting diodes and the like corresponding to the respective transmission lines 8. The lights of the light emitting elements forming the light emitting element array 10 are guided by fibers 11 and form a light projecting side digital optical signal array at a light projecting side fiber head plate 12. An encoder plate formed with Gray codes is indicated by reference numeral 13, and adapted to be moved between the light projecting side fiber head plate 12 and a light receiving side fiber head plate 14 in the opposite directions indicated by the arrow in FIG. 2. To the light receiving side fiber head plate 14 is connected optical fibers generally designated by reference numeral 15, and the amount of movement or the position of the encoder plate 13 is transmitted through an optical coupler 16 to an O/E (opto-electric) converter 17, and a signal is supplied to a FCC (Flight Control Computer) by a demodulator 18. Namely, the movement of a control surface by an actuator 19 is fed through the encoder plate 13 back to the FCC. Therefore, both the control signal from the pilot A and the position signal of the control surface are given to the FCC, and the control surface is accurately controlled at all times.

In the aforementioned control signal transmitting means using an optical sensor, it is necessary that a light be transmitted satisfactorily between the light projecting and receiving portions of the optical sensor. For example, in aircraft, the temperature and pressure around the aircraft is rapidly decreased as the aircraft flies high into the sky from the ground. For this reason, dew tends to occur in the light projecting and receiving portions or encoder plate, and if dew occurs, optical signals will not be transmitted satisfactorily between the light projecting and receiving portions and there will occur an adverse effect such as deterioration or disappearance of optical signals. An occurrence of dust also causes the same adverse effect.

FIG. 3 shows another conventional optical position sensor. In FIG. 3, reference numeral 21 designates an optical rotary encoder, and the light emitted from a light emitting element 22 is inputted to a light receiving element 27 through slits 24 formed in a rotary disc 23 and through a slit 26 formed in a stationary disc 25. An optical signal is converted into an electric signal by the light receiving element 27, and the waveform of the optical signal is shaped and outputted by a Schmitt trigger circuit 28. As the rotary disc 23 rotates, the light from the light emitting element 22 is intermittently inputted to the light receiving element 27. As a result, a pulse signal proportional to the rotary speed of the rotary disc 23 is outputted by the Schmitt trigger circuit 28.

However, since the conventional optical position sensor mentioned above is constructed such that the optical signal from the light emitting element 22 passes through air and is transmitted to the light receiving element 27, the optical signal tends to be damped and deteriorated due to dew occurring in the surfaces of the light emitting element 22 and light receiving element 27 and due to dust in air. For example, in the case pressure and temperature are rapidly changed during a short period as in the case of aircraft, dew is subject to occur because of the rapid change in pressure and temperature.

Accordingly, it is the object of the present invention to provide an improved optical position sensor which overcomes the drawbacks mentioned above and which can be used satisfactorily even under a condition wherein temperature and pressure rapidly change and which detects with high accuracy and is structurally compact.

SUMMARY OF THE INVENTION

In accordance with one important aspect of the present invention, there is provided an optical position sensor for an aircraft comprising: light emitting means for emitting light; first optical wave guiding means connected at its one end to the light emitting means and adapted for guiding the light emitted from the light emitting means; polarizing means connected at its one end directly to the other end of the first optical wave guiding means and adapted to convert the light into light having a unitary plane of polarization; a Faraday effect element connected at its one end directly to the other end of the polarizing means and having reflecting means at its other end; a movable magnetic scale disposed in opposed relationship to the reflecting means and having a plurality of magnetized segments mounted thereon, the unitary plane of polarization being optically rotated in accordance with the arrangement of the magnetized segments; polarization detecting means connected at its one end directly to the other end of the Faraday effect element and adapted to pass therethrough light wherein the plane of polarization thereof is not optically rotated; second optical wave guiding means connected at its one end directly to the other end of the polarization detecting means and adapted for guiding the light from the polarization detecting means; and opto-electric converting means connected to the other end of the second optical wave guiding means and adapted for converting the light guided by said second optical wave guiding means into an electric signal.

BRIEF DESCRIPTION OF THE DRAWINGS

The drawbacks of a prior-art optical position sensor and the features and advantages of an optical position sensor according to the present invention will be more clearly understood from the following description taken in conjunction with the accompanying drawings:

FIG. 7A is a diagram showing waveforms of time-delay pulse signals generated by the signal generator of FIG. 6;

FIG. 7B is a diagram showing waveforms after the pulse signals of FIG. 7A passed through the Faraday effect elements shown in FIG. 7A;

FIG. 7C is a diagram showing a coupled waveform after the signals shown in FIG. 7B is coupled by an optical coupler;

FIG. 10 is a block diagram showing an optical position sensor wherein the optical position sensor head according to the present invention is used;

FIG. 11A is a diagram showing input pulse signals of the optical position sensor shown in FIG. 10;

FIG. 11B is a diagram showing output pulse signals of the optical position sensor shown in FIG. 10;

FIG. 14 is a diagrammatic perspective view showing an optical position sensor constructed in accordance with a fourth embodiment of the present invention;

FIG. 15 is a top plan view of the optical sensor head shown in FIG. 14;

FIG. 23 is a top plan view of the optical position sensor head shown in FIG. 22;

FIG. 24 is a side elevational view of the optical position sensor head taken in the direction A of FIG. 23;

FIG. 25 is a side elevational view of the optical position sensor head taken in the direction B of FIG. 23;

FIG. 33 is a schematic diagram illustrating transmission paths of optical signals within the optical position sensor head of FIG. 30;

FIG. 34 is a schematic view illustrating transmission paths of optical signals in accordance with a ninth embodiment of the present invention.

DESCRIPTION OF THE PREFERRED EMBODIMENTS

Figure 4:
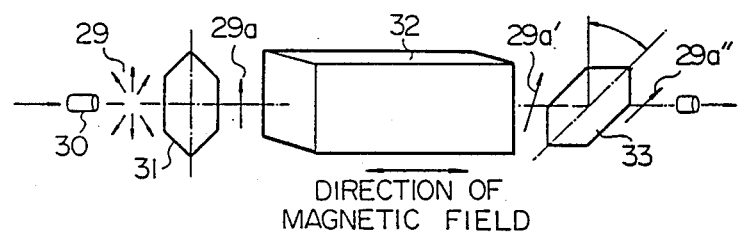
FIG. 4 is a perspective view showing the operational principle of an optical switching element wherein a Faraday effect element is employed.

Referring now in greater detail to the drawings and initially to FIG. 4, there is shown the operational principle of an optical switching element wherein a Faraday effect element is employed. A random polarization 29 guided by an optical fiber 30 passes through a polarizer 31 and is taken out as a linear polarization 29a. When this linear polarization 29a passes through a Faraday effect element (magneto-optical effect element) 32, the plane of polarization is optically rotated in the presence of magnetic field due to the Faraday effect. This optically rotated polarization 29a' passes through an analyzer 33 and is again taken out as a linear polarization 29a". The angle of polarization of the linear polarization 29a" depends upon the intensity of magnetic field. By utilizing this principle, an ON-OFF signal of a light can be taken out in the presence of magnetic field. More particularly, by moving a magnetic scale (encoder plate) having magnets (not shown) toward and away from the Faraday effect element 32, the optical path of the Faraday effect element 32 is opened and closed without contact, and a position-detection signal (of the magnetic scale) can be taken out.

Figure 5:
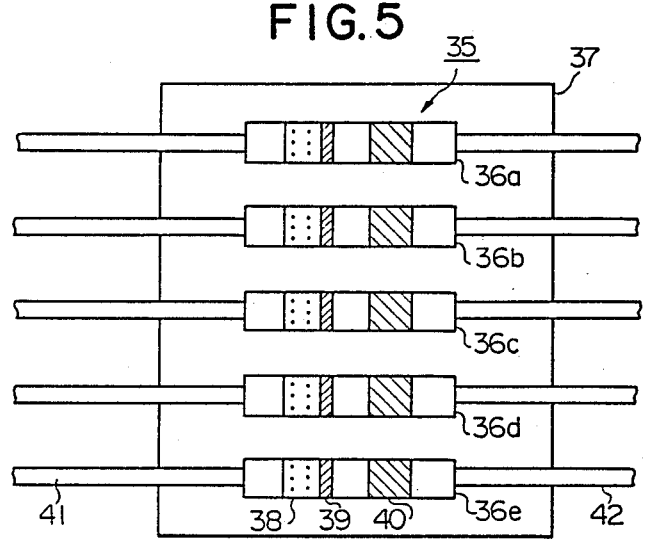
FIG. 5 is a side view showing an optical switching element array comprising a plurality of optical switching elements each having a Faraday effect element.

Referring to FIG. 5, there is shown a set of optical switching element array 35 comprising a plurality of optical switching elements 36a, 36b, 36c, and 36d and 36e which are arranged in parallel on a substrate 37 and each of which includes a polarizer 38, a Faraday effect element 39 and an analyzer 40. Reference numerals 41 and 42 indicate optical fibers for optical waveguides, respectively.

Figure 6:
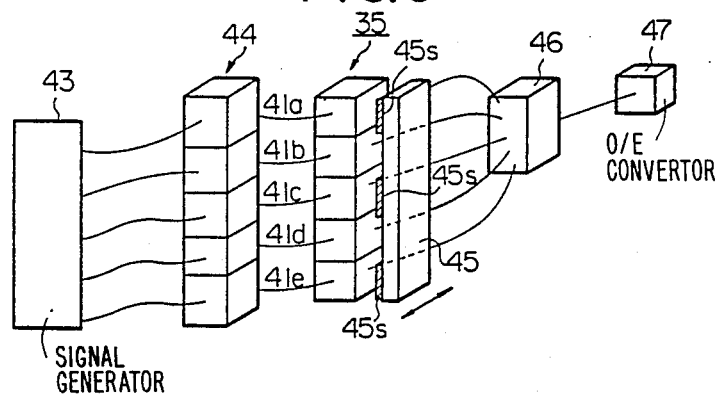
FIG. 6 is a perspective view showing the operational principle of an optical position sensor according to the present invention.

The optical switching element array 35 of the present invention having the aforesaid structure can obtain a position signal in cooperation with a magnetic scale moving in opposed and parallel relationship with the array. In the signal waveform shown in FIGS. 7A, 7B and 7C, time-delay pulse signals are shown in FIG. 7A are transmitted to a light emitting element array 44 comprising laser diodes and the like by a signal generator 43. These signals are transmitted through optical waveguides 41a, 41b, 41c, 41d and 41d to the optical switching elements 36a, 36b, 36c, 36d and 36e of the optical switching element array 35, respectively, each of the signals having the number of bits corresponding to the number of optical switching elements. If a magnetic scale (encoder plate) 45 having magnets 45s, 45s and 45s as shown in FIG. 6 is moved to the optical switching element array 35, only the optical switching elements 36a, 36c and 36e located in opposed relationship to the magnets 45s, 45s and 45s will pass lights therethrough by Faraday effect, and therefore the optical signals as shown in FIG. 7b will be taken out. These signals are coupled by an optical coupler 46 and become an optical signal as shown in FIG. 7c. The coupled signal is converted into an electrical signal by an O/E (opto-electric) convertor 47 and becomes a position-detection signal or control signal.

Figure 8:
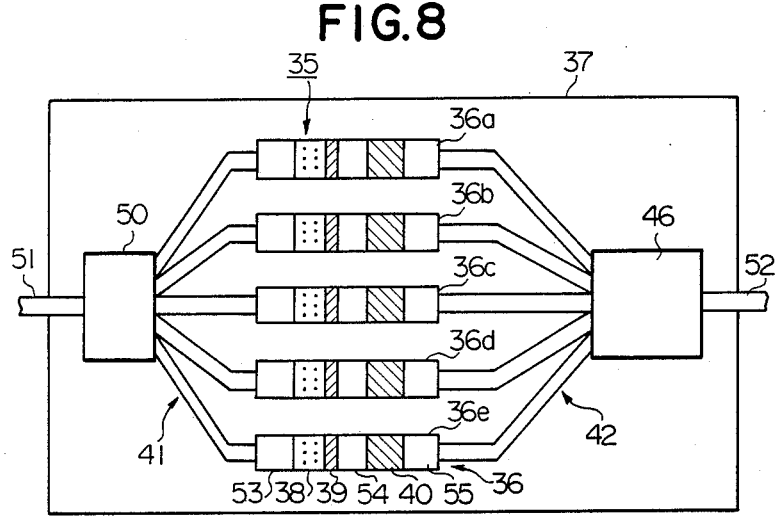
FIG. 8 is a side view showing a first embodiment of an optical position sensor head according to the present invention.

Referring to FIG. 8, there is shown a first embodiment of an optical sensor head according to the present invention wherein the aforesaid principle of the Faraday effect shown in FIGS. 4 through 7 is utilized. In FIG. 8, reference numerals 37, 50 and 46 indicate a sensor substrate, an optical multiplexer and an optical demultiplexer, respectively. By using optical filers in optical waveguides 41, an optical distributor can also be used as a substitute for the optical multiplexer 50. Reference numerals 51 and 52 indicate optical fibers which are connected to the optical multiplexer 50 and the optical coupler 46, respectively. An optical switching element array generally designated by reference numeral 35 comprises a plurality of optical switching elements 36a, 36b, 36c, 36d and 36e each having a Faraday effect element 39. Each optical switching element 36 is connected through the corresponding optical waveguides 41 and 42 to the optical multiplexer 50 and the optical coupler 46. The optical switching element 36 comprises a lens 53, polarizer 38, Faraday effect element 39, lens 54, analyzer 40 and lens 55. The aforementioned optical elements located between the optical multiplexer 50 and the optical coupler 46 are provided in the sensor substrate 37 and form a set of optical position sensor.

Figure 9:
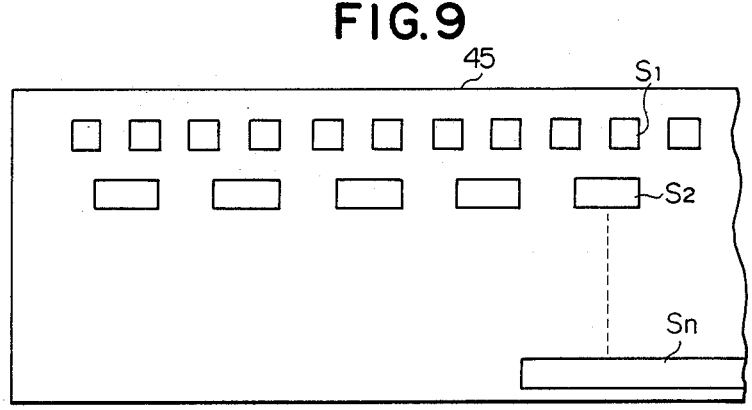
FIG. 9 is a side view showing an encoder plate which is used with the optical position sensor according to the present invention.

FIG. 9 schematically illustrates an encoder plate 45 used in combination with the optical sensor head of the present invention. On the encoder plate 45, there are arranged a plurality of magnets S1, S2 . . . and Sn in accordance with the number of bits of the optical switching elements 36 of the optical switching element array 35.

Figure 1:
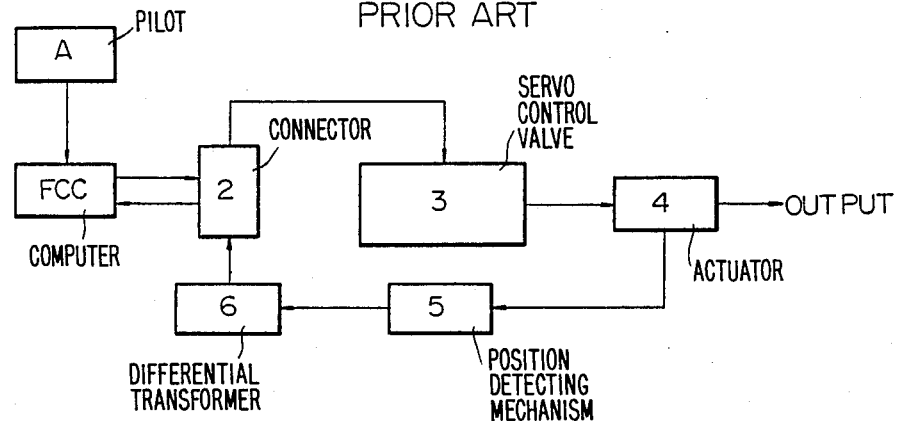
FIG. 1 is a block diagram showing the operational principle of a conventional actuator for controlling control surfaces of aircraft wherein a fly-by-wire method is employed.
Figure 2:
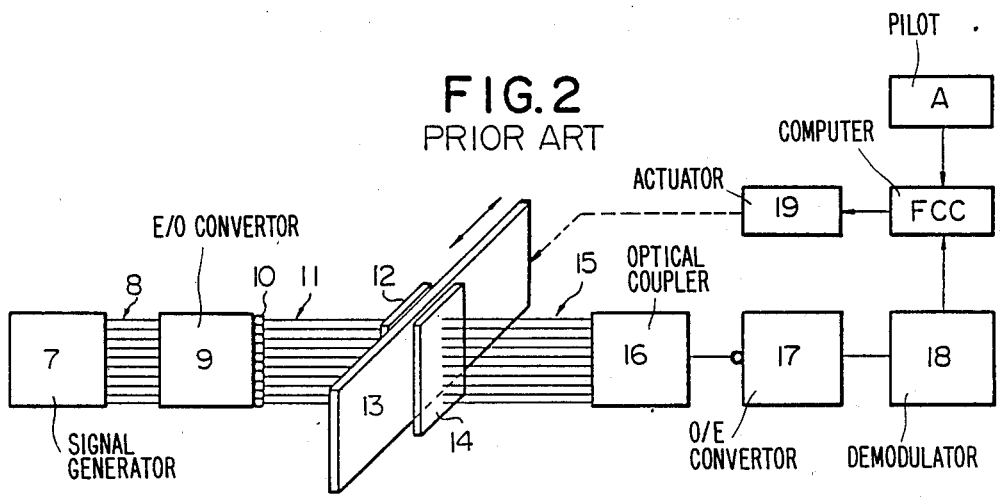
FIG. 2 is a block diagram showing the principle of a conventional actuator for controlling control surfaces of aircraft wherein a conventional optical linear encoder is employed.
Figure 3:
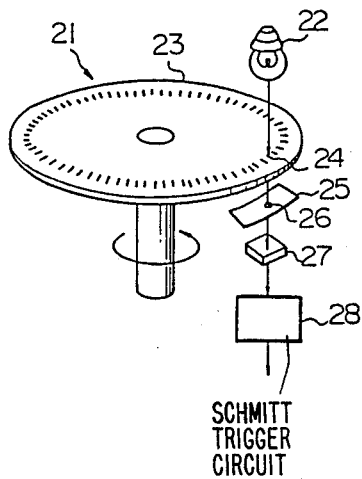
FIG. 3 is a perspective view showing a rotary encoder wherein a conventional optical position sensor is employed.

FIG. 10 shows an optical position sensor wherein an optical position sensor head according to the present invention is used. The members of the optical position sensor substantially identical in function to those members shown in FIGS. 5 through 9 are designated by like reference numerals. A signal generator 43 successively transmits time-delay pulse signals (for example, ten bits) as shown in FIG. 11A to each of transmission lines 61. These pulse signals are supplied by an E/O (electro-optical) convertor 62 to a light emitting element array 63 comprising light emitting diodes or different semiconductor lasers of different wave length and the like corresponding to the respective transmission lines 61. The lights of the light emitting elements of the light emitting element array 63 are guided by optical fibers 64 to a unitary optical fiber 51 through an optical coupler 65. The light guided to the optical fiber 51 is distributed to switching elements 36 of an optical switching element array 35 by an optical multiplexer 50 mounted on a sensor substrate 37. The distributed lights are guided to an optical multiplexer 66 through an optical coupler 46 and an optical fiber 52. The light guided to the optical multiplexer 66 is transmitted through optical fibers 67 to a light receiving element array 68. When the distributed lights by the optical multiplexer 50 pass through the corresponding optical switching elements 36 of the optical switching element array 35, only the optical switching elements 36 located in opposed relationship to the magnets of an encoder plate 45 pass lights therethrough by the Faraday effect. As a result, the position signal of the encoder plate 45 detected by the light receiving element array 68 becomes an intermittent time series pulse as shown in FIG. 11B by an O/E (opto-electric) convertor 47 and is inputted to a demodulator 69. This signal is to be inputted as a binary position-detection signal to a computer (for example, the FCC of FIG. 1 and the like) by the demodulator 69.

Figure 12:
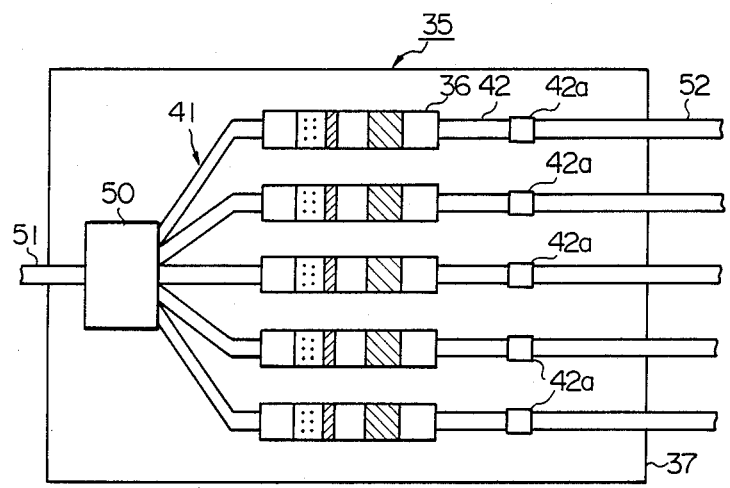
FIG. 12 is a side view showing a second embodiment of the optical position sensor head according to the present invention.

FIG. 12 shows a second embodiment of the optical position sensor head according to the present invention. The members substantially identical to those of the first embodiment of FIG. 8 are designated by like reference numerals and therefore the description will hereinafter be omitted. This second embodiment is characterized in that an input signal is transmitted from a unitary optical fiber 51 to each of optical switching elements 36 of an optical switching element array 35 through an optical multiplexer 50 (or optical distributor) and inputted to the corresponding CCD (Charge Coupled Device) array on photodiode (not shown) through optical fiber connectors 42a.

Figure 13:
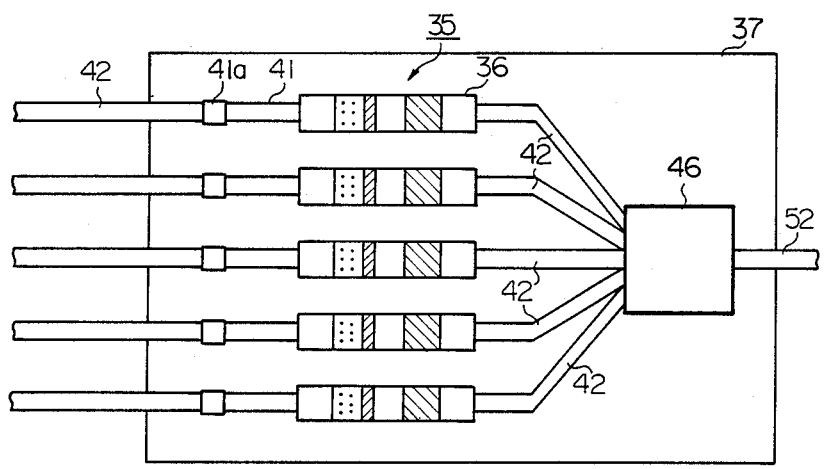
FIG. 13 is a side view showing a third embodiment of the optical position sensor head according to the present invention.

FIG. 13 shows a third embodiment of the optical position sensor head according to the present invention. The members substantially identical to those of the first embodiment of FIG. 8 are designated by like reference numerals for avoiding the detailed description. This third embodiment is characterized in that a plurality of input signals are independently transmitted to the corresponding optical switching elements 36 of an optical switching element array 35 and taken out from a unitary optical fiber 52 through optical waveguides 42 and an optical coupler 46.

The form or number of the aforementioned optical multiplexers (or optical distributors) 50, optical demultiplexers 46 and optical fiber connectors 41a or 42a can be changed in accordance with the difference of signal processing system (for example, optical wavelength multiplexing and time-division multiplexing) or the difference of external connectors (for example, a form and the like of optical fiber connectors).

Referring to FIGS. 14 through 17, there is shown a fourth embodiment of an optical position sensor according to the present invention.

In FIG. 14, a linear encoder 81 has a magnetic scale 83 which is driven to linearly move in the directions X—X' shown in FIG. 14 by an actuator 82. The actuator 82 is adapted to control an angle of control surfaces of rudders and the like of aircraft, and the linear movement of the magnetic scale 83 corresponds to the angle of control surfaces. A optical position sensor head 85 is disposed in opposed relationship to the magnetic scale 83. On the surface 84 of the magnetic scale 83 opposed to the optical position sensor head 85 are uniformly arranged a plurality of magnetized segments (not shown). The arrangement of the magnetized segments is closely related to the structure of the optical position sensor head 85 which is disposed in opposed and non-contact relationship to the magnetic scale 83, and this will hereinafter be described. Reference numeral 86 indicates a group of optical fibers for inputting input optical signals to the optical position sensor head 85, while reference numeral 86' indicates a group of optical fibers for outputting output optical signals of the optical position sensor head 85.

Figure 16:
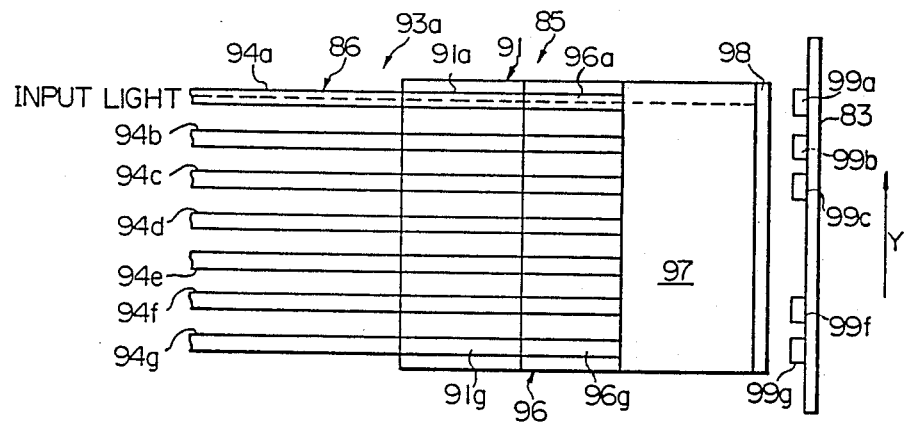
FIG. 16 is a side elevational view of the optical position sensor head shown in FIG. 15.

FIG. 15 is a top plan view of the optical position sensor head 85 which is disposed in opposed relationship to the magnetic scale 83, while FIG. 16 is a side elevational view of the optical position sensor head 85 shown in FIG. 15. In FIG. 16, the optical position sensor head 85 includes seven input optical waveguide 91a to 91g which are adapted to guide seven input lights to the optical position sensor head 85. It should be here noted that the members corresponding to the optical signals of seven systems are designated by characters a, b, c, d, e, f and g, respectively, and that only the members designated by character a will hereinafter be described for avoiding the description of the members b, c, d, e, f and g each having the same function. The seven systems are called channels, which are designated by characters CHa, CHb, CHc, CHd, CHe, CHf and CHg, respectively.

As shown in FIG. 15, the input optical waveguide 91a is connected at its one end to an optical fiber 94a forming a part of the optical fiber group 86, and at its the other end to a polarizer (polarizing means) 96a which is adapted to convert an input light into a light having a unitary plane of polarization. The polarizer 96a is connected to a Faraday effect element 97 which has reflecting means (Faraday effect reflection means) 98 mounted on the end face of the Faraday effect element 97 opposing to the magnetic scale 83. As shown in FIG. 15, the Faraday effect element 97 refracts the light guided by the polarizer 96a and directs the light to the reflecting means 98, while the reflecting means 98 reflects the light to pass the light again through the Faraday effect element 97. The optical path length within the Faraday effect element 97 becomes twice as compared with the case that a light is not reflected. According to the Faraday effect previously described, the Faraday effect element 97 is adapted to optically rotate the plane of polarization of the light being passing therethrough in accordance with the magnetism of the magnetized segments 99a to 99i g arranged on the magnetic scale 83. The reflected optical signal by the reflecting means 98 again passes through the Faraday effect element 97 and is guided to an analyzer (polarization detecting means) 100a which is adapted to select and pass therethrough only an optical signal having a predetermined plane of polarization. That is, in the case a plane of polarization is optically rotated by the Faraday effect, the analyzer 100a douses or interrupts the light, and in the case there is no rotation of plane of polarization, the analyzer 100a passes the light therethrough. To the analyzer 100a is connected an output optical waveguide 92a which guides to an optical fiber 95a the optical signal that passed through the analyzer 100a. The optical fiber 95a forms a part of the aforesaid group of optical fibers 86' which comprises seven optical fibers 95a to 95g.

The aforesaid optical fiber 94a for input lights, input optical waveguide 91a as a whole constitute a first optical waveguide 93a, while the output optical waveguide 92a and optical fiber 95a for output lights as a whole constitute a second optical waveguide 93a'. The first and second optical waveguides 93a and 93a' constitute first optical wave guiding means and second optical wave guiding means, respectively.

The Faraday effect element 97 provides a Faraday effect with respect to seven independent optical signals as shown in FIG. 16, and the magnetized segments 99 (only 99a to 99c, 99f and 99g are shown) of the magnetic scale 83 is provided in accordance with the seven independent optical signals that pass through the Faraday effect element 97. More particularly, the magnetized segments 99a to 99g are arranged in a direction shown by the arrow Y in FIG. 16 and in parallel relationship to the directions X—X' (FIG. 14) in which the magnetic scale 83 is moved. However, some of the magnetized segments 99a to 99g are not provided as shown in FIG. 16 for obtaining a predetermined optical signal, i.e., encode data, and this will hereinafter be described in detail.

Figure 17:
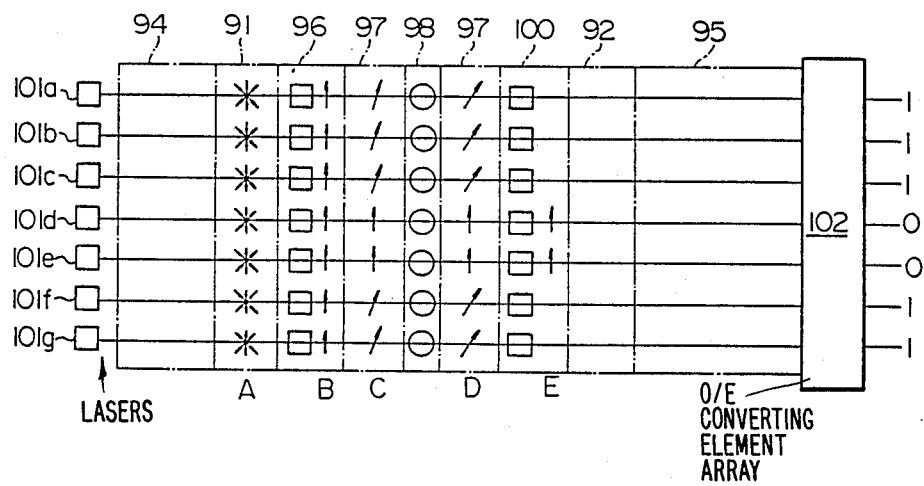
FIG. 17 is a schematic view illustrating transmission paths of optical signals within the optical position sensor head.

In one end portions of the optical fibers 94 (94a to 94g) for inputting seven optical signals to the optical position sensor head 85, there are provided seven semi-conductor lasers (light source) 101a to 101g each of which serves to emit an input light, as shown in FIG. 17. The optical semiconductor lasers 101a to 101g constitute light emitting means for emitting a light. Also, in one end portions of the optical fibers 95 (95a to 95g), there is provided an opto-electric converting element array (opto-electric converting means) 102 which has opto-electric converting elements (not shown) respectively corresponding to the channels CHa to CHg. The opto-electric converting element array 102 has a photodiode array, CCD (Charge Coupled Device) or the like for instance, and is adapted to convert the optical signal outputted from the optical position sensor head 85 into an electric signal (hereinafter referred to as "opto-electric conversion").

The operation of the linear encoder 81 constructed and arranged as mentioned above will hereinafter be described in detail.

FIG. 17 illustrates transmission paths of optical signals within the optical position sensor head 85. In FIG. 17, the arrows A and B indicate the plane of polarization of the optical signal immediately before and after the polarizer 96, the arrows C and D indicate the plane of polarization of the optical signal immediately before and after the reflecting means 98, and the arrow E indicates the plane of polarization of the optical signal immediately after the analyzer 100. It is noted that the signal names of the members corresponding to the channels CHa to CHg are designated by characters a to g, respectively.

The optical signals respectively emitted from the semiconductor lasers 101a to 101g are guided by the respective optical fibers 94a to 94g and inputted to the optical position sensor head 85. At this point, the plane of polarization of each of the optical signals Aa to Ag in the optical waveguides 91a to 91g is random as shown in FIG. 17, and the optical signals Aa to Ag are converted into optical signals Ba to Bg each having a unitary plane of polarization (linear polarization) by the polarizers 96a to 96g. The optical signals Ba to Bg pass through the Faraday effect element 97, become optical signals Ca to Cg and are reflected by the reflecting means 98. The reflected optical signals Ca to Cg pass again through the Faraday effect element 97 and become optical signals Da to Dg, respectively, which are inputted to analyzers 100a to 100g. When this occurring, if, as shown in FIG. 16, the magnetized segments 99a to 99c, 99f and 99g are arranged on the magnetic scale 83 in correspondence with the channels CHa to CHc, CHf and CHg, only the optical signals Ba to Bc, Bf and Bg are optically rotated by the aforesaid Faraday effect (Faraday rotation) and become the optical signals Ca to Cg. Further, as the optical signals Ca to Cg are reflected by the reflecting means 98 and again pass through the Faraday effect element 97, the angle of plane of polarization of the optical signals Da to Dc, Df and Dg becomes larger. If, therefore, the optical signals Dd and De wherein the Faraday rotation has not occurred and the optical signals Da to Dc, Df and Dg wherein the Faraday rotation has occurred are inputted to the respective analyzers 100a to 100g, the polarization of each of the optical signals Da to Dg will be detected for sure by the analyzers 100a to 100g. That is, the optical signals inputted to the analyzers 100a to 100g has been optically rotated in accordance with the arrangement of the magnetized segments 99a to 99c, 99f and 99g, and only the optical signals Cd and Ce wherein the Faraday rotation has not occurred, can pass through the analyzers 100d and 100e. In this intance, the optical signals Da to Dc, Df and Dg cannot pass through the analyzers 100a to 100c, 100f and 100g as they are optically rotated, and the optical signals Dd and De which passed through the analyzers are inputted through the optical waveguides 92d and 92e and through the optical fibers 95d and 95e to the opto-electric converting element array 102. Accordingly, if a logic is [0] when an optical signal is received in the opto-electric converting element array 102 and [1] when an optical signal is not received, the output of the array 102 will become [1 1 1 0 0 1 1] in the order of the channels CHa to CHg. This means that a digital output is obtained in accordance with the arrangement of the magnetized segment 99. The absolute position of the magnetic scale 83 therefore can be detected by the digital output occurring in accordance with the position of the magnetic scale 83.

Thus, as the transmission path of the optical signal does not pass through air and can be opened and closed in the presence of magnetic field, even if dew occurred on the surface of the optical position sensor head 85, the dew would have no effect on the transmission path of the optical signal. Accordingly, the optical signal can be effectively prevented from being damped and deteriorated even under circumstances wherein dew and the like tends to occur.

In addition to the aforesaid effect, there are also the following effects:

(I) As signals are transmitted by optical signals, they do not interfere with electronic circuits and the like, and also an occurrence of cross talk is very few.

(II) As the absolute position of the magnetic scale 83 is outputted as a digital value, the optical position sensor head 85 can be obtained which is suitable for use in a control system using a digital value.

(III) As electronic parts are not included within the optical position sensor head 85, power supply lines are not needed and also and also a recovery could be made rapidly even if there were an occurrence of EMI (Electromagnetic Interference) or EMP (Electromagnetic Pulse). Further, as the head 85 is structurally simple, production cost can be reduced and reliability can be enhanced.

(IV) As detecting means, i.e., the optical position sensor head 85 is disposed in non-contact relationship to the magnetic scale 83, durability can be enhanced.

(V) As the reflecting means 98 is provided in the face of the optical position sensor head 85 opposite to the magnetic scale 83, the optical path length within the Faraday effect element 97 can be doubled and the sensibility of the optical position sensor head 85 can be greatly enhanced.

Referring to FIGS. 18 through 21, there is shown a fifth embodiment of an optical position sensor according to the present invention. The members substantially identical to those of the fourth embodiment shown in FIGS. 14 to 17 are designated by like reference numerals for avoiding the detailed description. The fifth embodiment is characterized in that a light emitted from a unitary light source is distributed into a plurality of parallel input lights.

Figure 18:
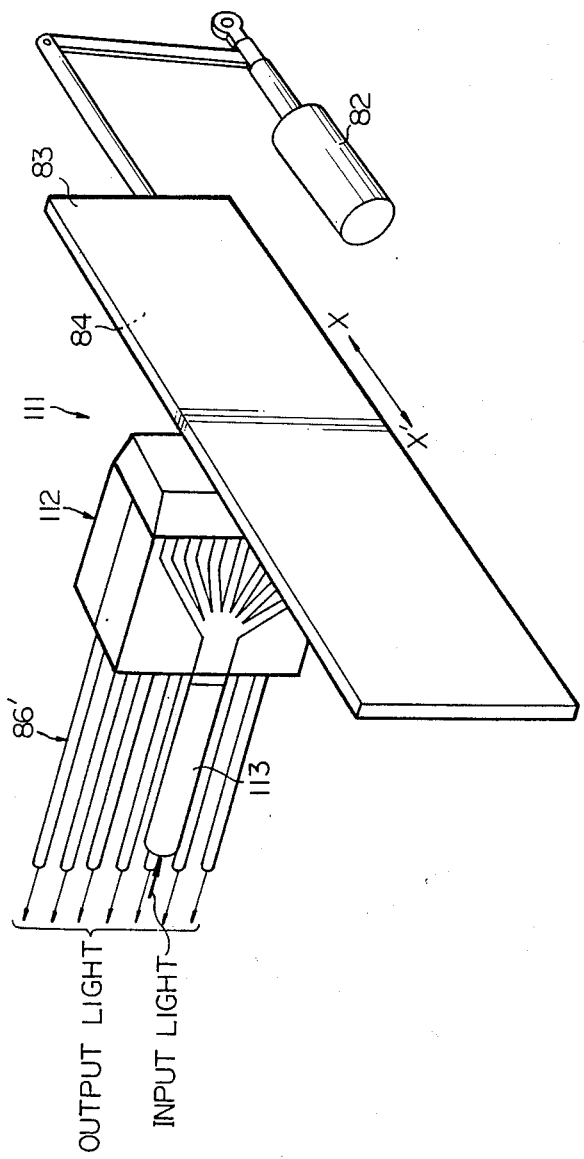
FIG. 18 is a diagrammatic perspective view showing an optical position sensor constructed in accordance with a fifth embodiment of the present invention.

In FIG. 18, a linear encoder 111 has a magnetic scale 83 which is driven to linearly move in directions X—X' shown in FIG. 18 by an actuator 82. An optical position sensor head 112 is disposed in opposed relationship to the magnetic scale 83. On the surface 84 of the magnetic scale 83 opposed to the optical position sensor head 112 are uniformly arranged a plurality of magnetized segments (not shown). The optical position sensor head 112 has a unitary optical fiber 113 for guiding an input light.

Figure 19:
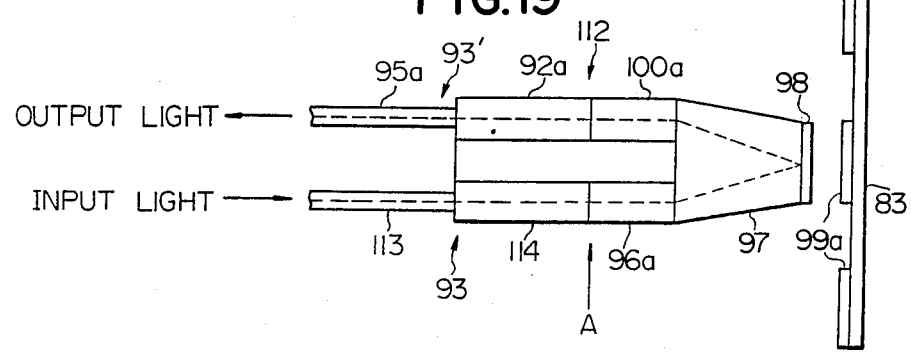
FIG. 19 is a top plan view of the optical position sensor head shown in FIG. 18.
Figure 20:
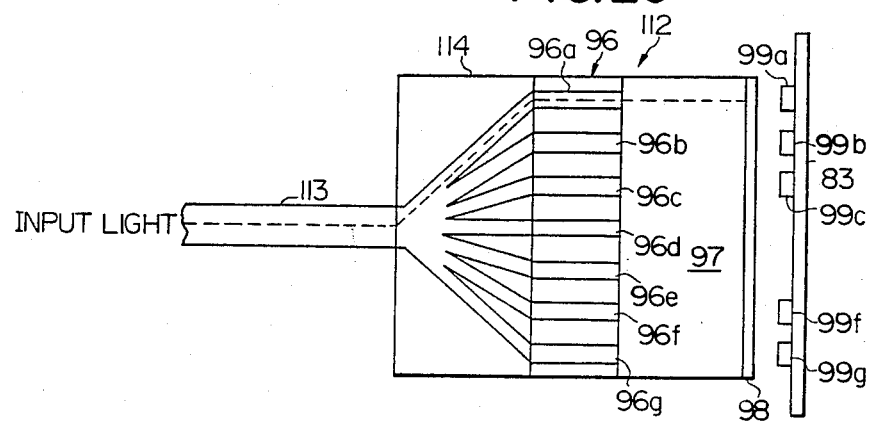
FIG. 20 is a side elevational view of the optical position sensor head taken in the direction A of FIG. 19.

FIG. 19 is a top plan view of the optical position sensor head 112 which is disposed in opposed relationship to the magnetic scale 83, while FIG. 20 is a side elevational view of the optical position sensor head 12 shown in FIG. 19. In FIG. 20, the optical position sensor head 112 includes the distributing means (optical distributor) 114 connected to the unitary optical fiber 113, which optical distributor 114 is adapted to distribute the input light guided by the unitary optical fiber 113 into seven lights. The unitary optical fiber 113 and the optical distributing means 114 as a whole constitute first optical wave guiding means 93. As previously mentioned, the members corresponding to the distributed seven input lights are designated by characters a, b, c, d, e, f and g, respectively, and only the member designated by character a will hereinafter be described for avoiding the description of the members b, c, d, e, f and g each having the same function.

The optical position sensor head 112 further includes the polarizing means 96 which is connected to at its one end to the optical distributor 114 and at its the other end to a Faraday effect element 97. The polarizing means 96 comprises seven polarizers 96a, 96b, 96c, 96d, 96e, 96f and 96g. The Faraday effect element 97 has reflecting means (Faraday effect reflection means) 98 mounted on the end face of the Faraday effect element 97 opposing to the magnetic scale 83. A reflected optical signal by the reflecting means 98 is guided to an analyzer (polarization detecting means) 100a as shown in FIG. 19. To the analyzer 100a is connected an optical waveguide 92a which guides to an optical fiber 95a the optical signal that passed through the analyzer 100a. The optical fiber 95a forms a part of a group of optical fibers 86' for outputting the output signal of the optical position sensor head 112, and the optical fibers 86' comprises seven optical fibers 95a to 95g. The optical fiber 95a and the optical waveguide 92a as a whole constitute second optical wave guiding means 93'.

Figure 21:
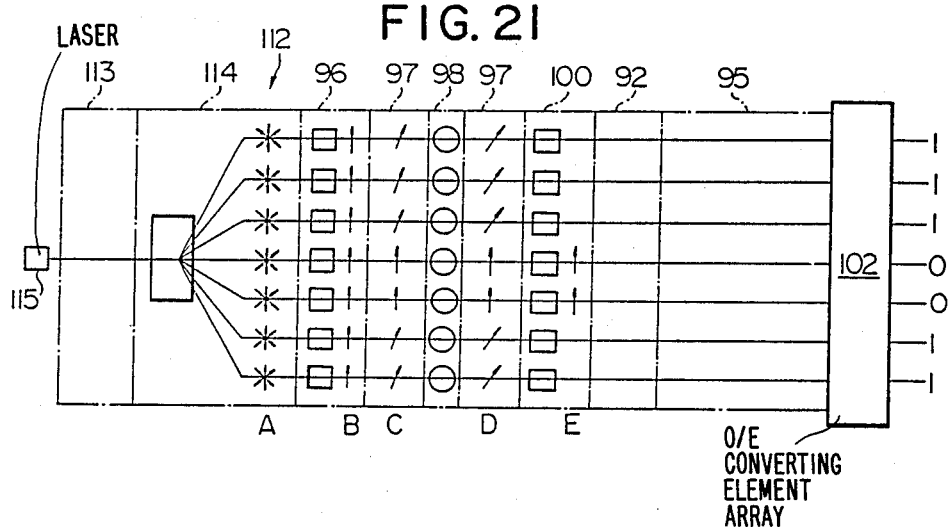
FIG. 21 is a schematic view illustrating transmission paths of optical signals within the optical position sensor head according to the fifth embodiment.

In one end portion of the optical fiber 113 for inputting an optical signal to the optical position sensor head 112, there is provided a unitary semiconductor laser (light emitting means) 115 which serves to emit an input optical signal, as shown in FIG. 21. The light emitted from the semiconductor laser 115 is guided as an input light by the optical fiber 113 and distributed into optical signals Aa through Ag by the optical distributor 114. As mentioned in the fourth embodiment, the optical signals Aa through Ag are guided through the polarizers 96. Faraday effect element 97, reflecting means 98, analyzer (polarization detecting means) 100, optical waveguide 92 and through optical fibers 95 to an opto-electric converting element array (transfer means) 102. Like the fourth embodiment of FIG. 14, a digital output signal is obtained by the opto-electric converting element array (transfer means) 102 in accordance with the arrangement of the magnetized element on the magnetic scale 83.

Thus, as the transmission path of the optical signal does not pass through air, the same effect as the fourth embodiment will be obtained. In addition, by providing the optical distributor 114, the optical fiber 113 for guiding an input light to the optical position sensor head 112 can be made a unitary optical fiber and also the semiconductor laser 115 corresponding to the optical fiber 113 can be made a unitary system. This embodiment is specially suited where the distance of the optical fiber 113 becomes longer as in the case of aircraft and the like, and can greatly reduce expense as compared with the case that a plurality of semiconductor lasers are provided in accordance with a plurality of input lights.

Referring to FIGS. 22 to 28, there is shown an optical position sensor constructed in accordance with a sixth embodiment of the present invention. The members substantially identical to those of the fourth embodiment shown in FIGS. 14 to 17 are designated by like reference numerals for avoiding the detailed description. The sixth embodiment is characterized in that a plurality of time shared parallel input lights are inputted and a unitary optical signal is outputted.

Figure 22:
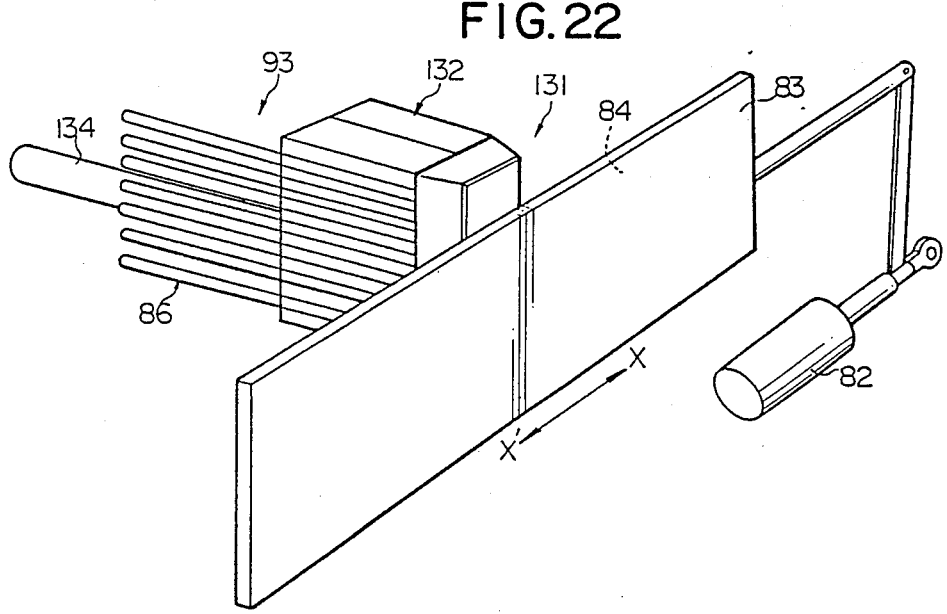
FIG. 22 is a diagrammatic perspective view showing an optical position sensor constructed in accordance with a sixth embodiment of the present invention.

In FIG. 22, reference numerals 131 and 132 denote a linear encoder and an optical position sensor head, respectively. The optical position sensor head 132 has connected thereto a group of optical fibers 86 for guiding an input light and a unitary optical fiber 134 for guiding an output light. FIG. 23 is a top plan view showing the optical position sensor head 132, FIG. 24 is a side elevational view of the optical position sensor head 132 taken in the direction A of FIG. 23 and FIG. 25 is a side elevational view of the optical position sensor head 132 taken in the direction B of FIG. 23. In FIG. 23, an input light is inputted through an optical fiber 94a forming a part of the group of optical fibers 86 and through an optical waveguide 91a to a polarizer (polarizing means) 96a. The light polarized by the polarizer 96a is guided to a Faraday effect element 97 by which the light is optically rotated according to the magnetism of a magnetized segment 99a. The optically rotated light is reflected by reflecting means (Faraday effect reflection means) 98. That is, as shown in FIG. 24, parallel input lights are guided to the Faraday effect element 97, and as shown in FIG. 25, the lights corresponding to channels CHa to CHg are guided through the Faraday effect element 97 and an analyzer 100a to optical mixing means (optical demultiplexer) 137. The demultiplexer 137 is adapted to mix and composite the lights corresponding to channels CHa to CHg, and the composite unitary light is guided by the second optical fiber 134. The aforesaid optical fiber group 86, optical waveguide 91 as a whole constitute first optical wave guiding means. The optical fiber 134 and demultiplexer 137 as a whole constitute second optical wave guiding means.

Figure 26:
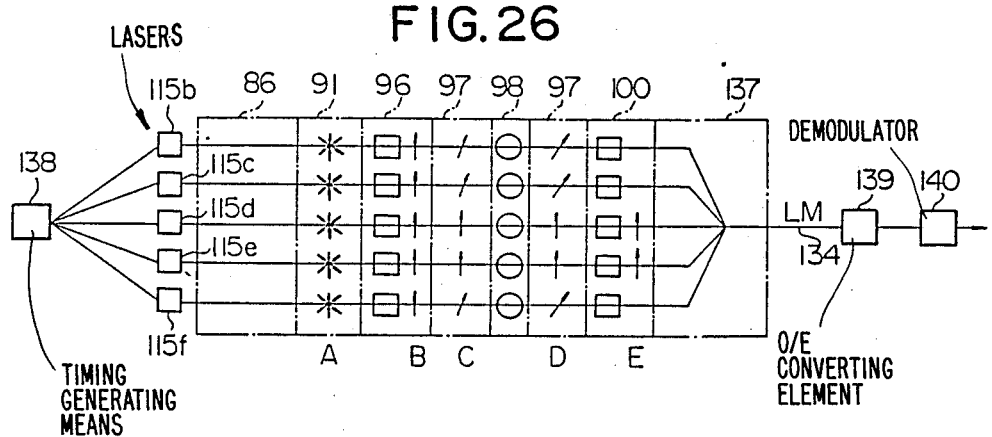
FIG. 26 is a schematic view illustrating transmission paths of optical signals within the optical position sensor head which is constructed in accordance with the sixth embodiment.
Figure 27:
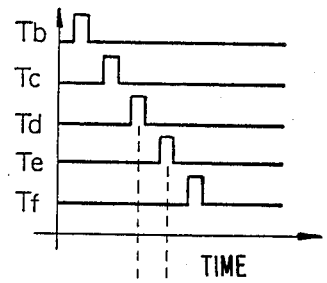
FIG. 27 is a diagram showing timing signals which are generated from the timing generating circuit of FIG. 26.
Figure 28:
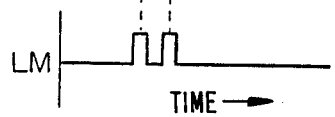
FIG. 28 is a diagram showing the output signal of the linear encoder according to the sixth embodiment when the timing signal Tb, Tc and Tf of FIG. 23 are given.

Although in one end portion of the optical fiber group 86 there are provided semiconductor lasers (light source) 115a, 115b, 115c, 115d, 115e, 115f and 115g, the semiconductor lasers 115a and 115g respectively corresponding the channels CHa and CHg are omitted as shown in FIG. 26. Each of the semiconductor lasers 115b to 115f is adapted to emit a light in response to timing signals Tb to Tf generated from timing generating means 138. As shown in FIG. 27, the timing signals Tb to Tf are pulse signals which are different in timing from one another. Therefore, the optical signals that pass through the Faraday effect element 97 are different in timing from one another in the accordance with the timing signals Tb to Tf. If the Faraday rotations are given as shown by the arrow C in FIG. 26, the optical signals Dd and De that passed through the analyzer 100 will be composited by the optical demultiplexer 137, and become a composite optical signal LM as shown in FIG. 28 which is to be guided by the second optical fiber 134. The composite optical signal LM is converted into an electric signal, i.e., serial data by an opto-electric converting element 139, and further inputted to a demodulator 140 and converted into parallel data having the same timing, i.e., encoded data.

The aforesaid opto-electric converting element 139 and demodulator 140 as a whole constitute converting means.

Thus, as the transmission path of the optical signal does not pass through air, the same effect as the fourth embodiment will be obtained. In addition, the sixth embodiment is advantageous in that the optical signal proportional to the magnetic change of the Faraday effect element 97, i.e., the output of the encoder 131 can be guided as a unitary optical signal LM by providing the optical demultiplexer 137.

Figure 29:
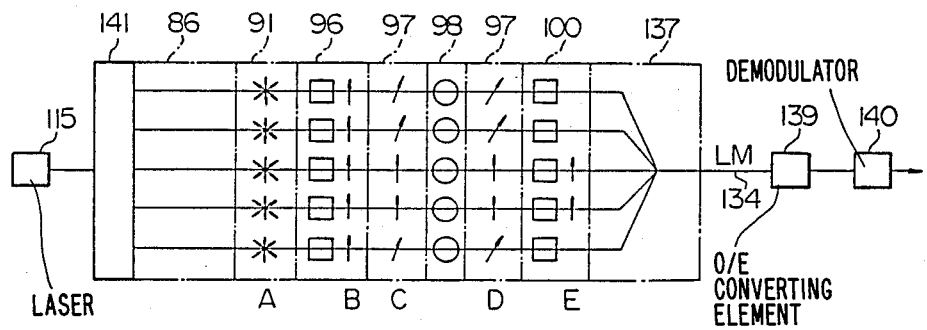
FIG. 29 is a schematic view illustrating transmission paths of optical signals in accordance with a seventh embodiment of the present invention.

FIG. 29 schematically illustrates transmission paths of optical signals in accordance with a seventh embodiment of the present invention. The optical position sensor head of this embodiment is not shown as being substantially identical in construction to the optical position sensor head 132 of the sixth embodiment shown in FIG. 22, but this embodiment is characterized in the manner in which an input light is given to the optical position sensor head. In FIG. 29, the members substantially identical to those of the sixth embodiment shown in FIG. 26 are designated by like reference numerals for avoiding the detailed description. The light emitted from a semiconductor laser 115 is guided to an optical switch (sharing means) 141 which is adapted to output time shared optical signals to the respective optical channels CHb to CHf in accordance with the timings as shown in FIG. 27. As in the case of the sixth embodiment, time shared lights are inputted to the optical position sensor head 132, but in this embodiment the same input lights as the sixth embodiment are obtained by the provision of the optical switch (sharing means) 141 in place of the semiconductor lasers 115a to 115g of the sixth embodiment which emit lights in accordance with predetermined timing signals Ta to Tg of FIG. 27. Accordingly, the seventh embodiment can reduce production cost as the semiconductor laser 115 comprises a unitary semiconductor laser.

In the seventh embodiment, the unitary semiconductor laser 115 constitutes optical emitting means. The optical sharing means 141, a plurality of first optical fibers 86 and a plurality of first waveguides 91 as a whole constitute first optical wave guiding means. Optical mixing means 137 and an optical fiber 134 as a whole constitute second optical wave guiding means.

FIGS. 30 to 33 illustrate an optical position sensor constructed in accordance with an eighth embodiment of the present invention. The members substantially identical in construction to those of the fourth embodiment are designated by like reference numerals for avoiding the detailed description.

Figure 30:
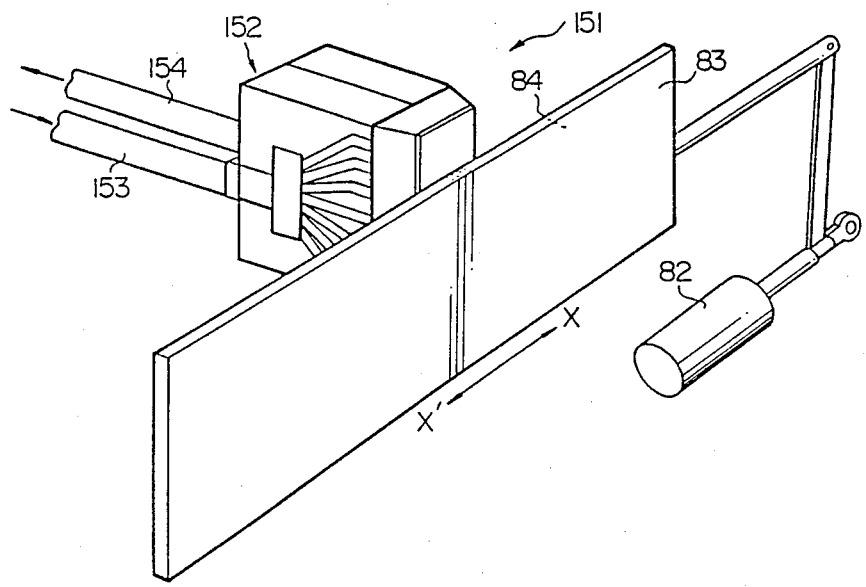
FIG. 30 is a diagrammatic perspective view showing an optical position sensor constructed in accordance with an eighth embodiment of the present invention.

In FIG. 30, reference numerals 151 and 152 designate a linear encoder and an optical position sensor head, respectively. The input and output lights of the optical position sensor head 152 are guided by a unitary optical fiber 153 and a unitary optical fiber 154, respectively. Each of the optical fibers 153 and 154 is adapted to transmit at the same time a plurality of lights which are different in wave length from one another. This will hereinafter be referred to as "wavelength multiplexing".

Figure 31:
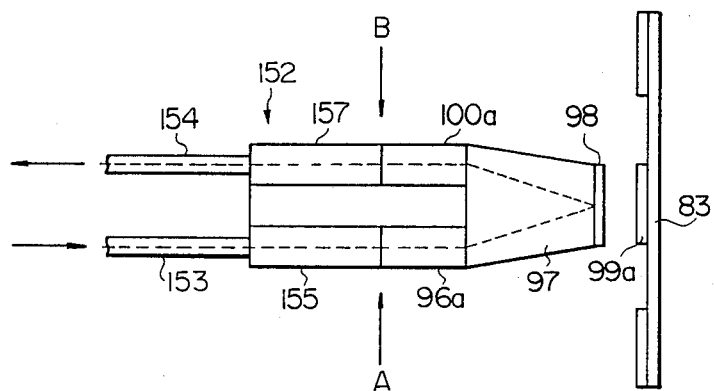
FIG. 31 is a top plan view of the optical position sensor head shown in FIG. 30.
Figure 32:
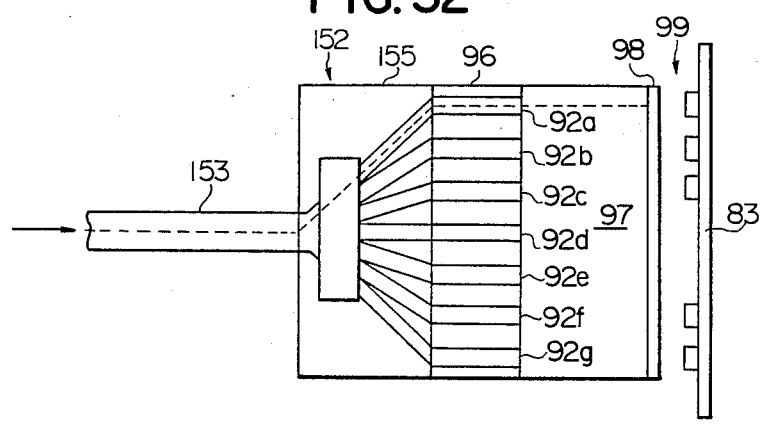
FIG. 32 is a side elevational view of the optical position sensor head taken in the direction A of FIG. 30.

In FIG. 31, input lights each having a different wave length are guided by the optical fiber 153 and multiplexed by a first optical multiplexer (first multiplexing means) 155. The multiplexed lights are linearly polarized by polarizers 96a, 96b, 96c, 96d, 96e, 96f and 96g. The input lights to be guided to the optical fiber 153 is guided, as shown in FIG. 33, by a first optical demultiplexer (first mixing means) 156 which is adapted to composite lights emitted from semiconductor lasers 157b to 157f and transmit a unitary composite light.

The aforesaid first optical demultiplexer 156, optical fiber 153, first optical multiplexer 155 as a whole constitute first optical wave guiding means.

The semiconductor lasers 157b to 157f are adapted to emit time shared lights in accordance with a timing signal from a timing generating circuit (timing generating means) 138, and the emitted lights are different in wave length from one another. Therefore, the timings of the lights which pass through the Faraday effect element 97 become different from one another, and a serial optical signal composited by a second optical demultiplexer (second mixing means) 158 is guided through an optical fiber 154 to a second optical multiplexer (second multiplexing means) 159.

The semiconductor lasers and timing generating means 138 constitute light emitting means. The second optical demultiplexer 158, optical fiber 154 and second optical multiplexer 159 constitute second optical wave guiding means.

The lights guided to the second optical multiplexer 159 are fractionated into different lights of different wave lengths respectively corresponding to the semiconductor lasers 157b to 157f, and the fractionated different lights are inputted to an opto-electric converting element array 160 corresponding to channels CHb to CHf. The opto-electric converting element array 160 comprises opto-electric converting elements each having sufficient sensibility to the wave length of a light to be received, and even if the wave length were different, the output level of the opto-electric conversion would be maintained constant. The electric signals outputted from the opto-electric converting element array 160 are different in timing from one another, and converted into parallel data having the same timing, i.e., encoded data by a demodulator 140.

Thus, in the eighth embodiment the same effect as the fourth embodiment can be obtained by time sharing an input light and by "wavelength multiplexing" (i.e., by transmitting at the same time a plurality of lights which are different in wave length from one another). For this reason, the eighth embodiment is advantageous in that each of the optical fibers 153 and 154 can be made a unitary optical fiber.

FIG. 34 schematically illustrates transmission paths of optical signals in accordance with a ninth embodiment of the present invention. This embodiment is substantially identical to the eighth embodiment shown in FIG. 33 except that an input light is not time shared. Therefore, this embodiment does not need the timing generating circuit 138 and demodulator 140 as shown in FIG. 33. In addition to the effect of the eighth embodiment, this embodiment is structurally simple and can reduce production cost.

Figure 35:
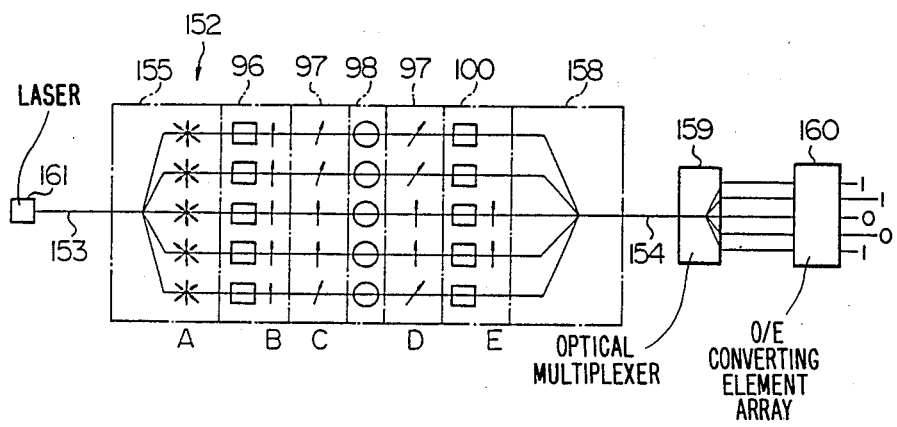
FIG. 35 is a schematic view illustrating transmission paths of optical signals in accordance with a tenth embodiment of the present invention.

FIG. 35 schematically illustrates transmission paths of optical signals in accordance with a tenth embodiment of the present invention. This embodiment is characterized in that light emitting means comprises a unitary semiconductor laser 16 and that a plurality of lights which are different in wave length from one another are transmitted at the same time. The semiconductor laser 161 is adapted to emit a plurality of different lights which are different in wave length from one another. The light emitted from the semiconductor laser 161 is guided to a multiplexer 155 by an optical fiber 153, and is fractionated into lights each having a predetermined wave length by the multiplexer 155. Accordingly, in this embodiment the same effect as the ninth embodiment can be obtained by provision of the semiconductor laser 161. For this reason, this embodiment is more structurally simple and can further reduce production cost.

While the optical position sensor according to the present invention has been applied to a linear encoder which detects a position of a body, it is noted that it also may be applied to a rotary encoder which detects a rotation of a rotary body. In addition, the present invention is applicable to a demodulator, since an optical signal passing through an optical position sensor head is demodulated by arranging a magnetic head, which gives magnetism to the Faraday effect element 97 and which has channels corresponding in number to those of an optical position sensor head, in opposed relationship to the optical position sensor head and by changing a polarity of the magnetism generated by the magnetic head. Furthermore, the present invention is applicable to an optical switch of the multichannel type, since a plurality of different optical signals can be obtained in proportion to electric signals impressed to the magnetic head by changing the magnetic intensity so that an angle of the Faraday rotation is changed in proportion to the magnetic intensity. Furthermore, although in the aforementioned embodiments the optical path length within the Faraday effect element is doubled by reflecting a light one time by the use of the reflecting means 98, the optical path length can be greatly increased by reflecting several times the light within the Faraday effect element 97 by the use of a plurality of reflecting means, and furthermore an optical sensor having high sensibility can be obtained.

From the foregoing description, it will be seen that in accordance with the present invention there is provided an optical position sensor which is capable of controlling a light emitted from a light source without passing through air by the use of the aforementioned "Faraday effect" and which can prevent the damp and deterioration of the light even under particular circumstances where dew and the like tend to occur.

While certain representative embodiments and details have been shown for the purpose of illustrating the invention, it will be apparent to those skilled in this art that various changes and modifications may be made therein without departing from the scope of the invention.

What I claim is:

1. An optical position sensor for use on an aircraft comprising:

light emitting means for emitting light;
first optical wave guiding means connected at its one end to said light emitting means and adapted for guiding said light emitted from said light emitting means;
polarizing means connected at its one end directly to the other end of said first optical wave guiding means and adapted to convert said light into light having a unitary plane of polarization;
a Faraday effect element connected at its one end directly to the other end of said polarizing means and having reflecting means at its other end;
a movable magnetic scale disposed in opposed relationship to said reflecting means and having a plurality of magnetized segments mounted thereon, the unitary plane of polarization being optically rotated in accordance with the arrangement of said magnetized segments;
polarization detecting means connected at its one end directly to the other end of said Faraday effect element and adapted to pass therethrough light wherein the plane of polarization thereof is not optically rotated;
second optical wave guiding means connected at its one end directly to the other end of said polarization detecting means and adapted for guiding said light from said polarization detecting means; and
opto-electric converting means connected to the other end of said second optical wave guiding means and adapted for converting said light guided by said second optical wave guiding means into an electric signal.

2. An optical position sensor as set forth in claim 1, wherein said first optical wave guiding means comprises a plurality of optical fibers and said polarizing means comprises a plurality of polarizers corresponding in number to said plurality of optical fibers and respectively connected directly with said plurality of optical fibers, and wherein said polarization means comprises a plurality of analyzers and said second optical wave guiding means comprises a plurality of optical fibers corresponding in number to said plurality of analyzers and respectively connected directly with said plurality of analyzers.

3. An optical position sensor as recited in claim 1, wherein said first optical wave guiding means, said polarizing means, said Faraday effect element, said polarization detecting means and said second optical wave guiding means comprise means to define a transmission path for an optical signal which does not pass through an air space.

* * * * *